United States Patent
Lee et al.

(10) Patent No.: US 9,393,690 B2
(45) Date of Patent: Jul. 19, 2016

(54) APPARATUS FOR INPUTTING TEACHING DATA AND APPARATUS AND METHOD FOR GENERATING TEACHING COMMAND FOR ROBOT

(71) Applicant: Electronics and Telecommunications Research Institute, Daejeon (KR)

(72) Inventors: Hoo Man Lee, Daejeon (KR); Joong Bae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 38 days.

(21) Appl. No.: 14/193,502

(22) Filed: Feb. 28, 2014

(65) Prior Publication Data

US 2015/0094853 A1 Apr. 2, 2015

(30) Foreign Application Priority Data

Oct. 1, 2013 (KR) .................. 10-2013-0117240

(51) Int. Cl.
*G05B 19/18* (2006.01)
*B25J 9/16* (2006.01)

(52) U.S. Cl.
CPC .................... *B25J 9/1602* (2013.01)

(58) Field of Classification Search
CPC ............ B25J 9/16; B25J 9/161; B25J 13/088; B25J 9/163; G01B 11/03; G01B 5/008; G01B 2219/37274; G01B 2219/40305
USPC ......... 700/245, 247, 249, 250, 257, 258, 259; 318/568.1, 568.11, 568.12, 568.13, 318/568.14, 568.16, 568.2, 568.22, 568.23
See application file for complete search history.

(56) References Cited

U.S. PATENT DOCUMENTS

| | | | | |
|---|---|---|---|---|
| 5,715,834 A | * | 2/1998 | Bergamasco et al. | 600/595 |
| 5,982,389 A | * | 11/1999 | Guenter et al. | 345/474 |
| 8,924,021 B2 | * | 12/2014 | Dariush et al. | 700/262 |
| 2005/0166413 A1 | * | 8/2005 | Crampton | 33/503 |
| 2005/0271279 A1 | * | 12/2005 | Fujimura et al. | 382/203 |
| 2007/0078564 A1 | * | 4/2007 | Hoshino | B25J 15/0009 700/245 |
| 2007/0255454 A1 | * | 11/2007 | Dariush | 700/245 |
| 2008/0009771 A1 | * | 1/2008 | Perry et al. | 600/587 |
| 2008/0188907 A1 | * | 8/2008 | Aguirre-Ollinger et al. | 607/48 |
| 2008/0235970 A1 | * | 10/2008 | Crampton | 33/503 |
| 2010/0152899 A1 | * | 6/2010 | Chang | B25J 9/162 700/262 |
| 2011/0192042 A1 | * | 8/2011 | McMurtry et al. | 33/503 |
| 2012/0056800 A1 | * | 3/2012 | Williams | G06F 3/011 345/156 |
| 2013/0141431 A1 | * | 6/2013 | Kawakami | G06T 13/40 345/419 |
| 2014/0277744 A1 | * | 9/2014 | Coenen | 700/264 |
| 2014/0297034 A1 | | 10/2014 | Lee | |

FOREIGN PATENT DOCUMENTS

| | | |
|---|---|---|
| JP | 07299773 A * | 11/1995 |
| JP | 2010-152618 | 7/2010 |
| KR | 10-2011-0057793 | 6/2011 |
| KR | 10-2011-0125865 | 11/2011 |
| KR | 10-2011-0136036 | 12/2011 |
| KR | 10-2014-0119568 | 10/2014 |

* cited by examiner

*Primary Examiner* — Jaime Figueroa
(74) *Attorney, Agent, or Firm* — Kile Park Reed & Houtteman PLLC

(57) ABSTRACT

An apparatus for inputting teaching data for a robot includes a first input interface configured to input teaching data of a path layer; and a second input interface configured to input teaching data of a task layer.

3 Claims, 4 Drawing Sheets

APPARATUS FOR INPUTTING TEACHING DATA AND APPARATUS AND METHOD FOR GENERATING TEACHING COMMAND FOR ROBOT

CROSS-REFERENCE TO RELATED APPLICATION(S)

The present invention claims priority of Korean Patent Application No. 10-2013-0117240, filed on Oct. 1, 2013, which is incorporated herein by reference.

FIELD OF THE INVENTION

The present invention relates to a teaching data input and a teaching command generation, and more specifically, to an apparatus for inputting teaching data in two layers and an apparatus and method for generating a teaching command using the same.

BACKGROUND OF THE INVENTION

In recent years, consumers want to perform various tasks with one intelligent device. Therefore, robots to be developed in future need to have a capability of performing various categories of tasks or a learning ability for carrying out new tasks. And, for efficient use of these robots, it is necessary to develop simple and intuitive robot teaching technologies to pass a command from a user to a robot to teach a new task or take advantage of existing tasks that the robot can perform.

A layer of performing the teaching to the robot can be divided into two layers. One is a teaching of a path layer to interpret teaching data by performing a trajectory encoding of the teaching data and the other is a teaching of a task layer to interpret the teaching data by performing a symbolic encoding of the teaching data. The path layer is mainly used in industrial robots, which interprets teaching contents as a non-linear mapping between the teaching data and a motor command to pass a command to a servo controller of a motor. The task layer is widely utilized in researches of service robots, which interprets a task that is taught by dividing it into a series of a unit act-cognition to pass a command to a host controller of the robot.

Meanwhile, an industrial robot is at a level that receives a teaching of exact location, i.e., path only, for a repetitive task. However, a service robot needs to work a task in correspondence with sensor information in a dynamic environment and thus the task of the robot is done through a command in the task layer that is abstracted more than usual. Most of the teachings to the industrial robot is made in the path layer through a robot language programming or teaching pendant being made in the path layer, but the industrial robot in a future needs to prepare to receive the teaching of the task layer so as to properly cope with various situations.

An existing industrial robot that is used in the industrial site mostly takes teaching data through a teach pendant. However, the use of the teach pendant requires off-line programming in advance and is a way of defining the task of the robot through the off-line programming and then teaching only the required position with a teach pendant.

However, in recent years, the role of the industrial robots also becomes diversified as well as the service robot and there is a need for a method for inputting teaching data that is capable of easily teaching the industrial robots in industrial site. In other words, because off-line programming experts are not resident on the industrial site, it is necessary to provide an intuitive teaching data entry method which enables omit the off-line programming.

SUMMARY OF THE INVENTION

In view of the above, the present invention provides an apparatus for inputting teaching data of a path layer and a task layer.

Further, the present invention provides an apparatus and method for interpreting teaching data of a path layer and a task layer to produce a command corresponding thereto.

In accordance with a first aspect of the present invention, there is provided an apparatus for inputting teaching data for a robot. The apparatus includes a first input interface configured to input teaching data of a path layer; and a second input interface configured to input teaching data of a task layer.

Further, the first input interface may comprise an exoskeleton-type hardware-based input interface.

Further, the first input may comprise one or more sensors configured to measure rotation angles of joints of the user; a calculation unit configured to calculate rotation angular velocity and rotation angular acceleration of the joints using the joint rotation angles; and a first teaching data producing unit configured to produce the teaching data of the path layer based on the rotation angle, rotation angular velocity and rotation angular acceleration of the joints.

Further, the calculation unit may be configured to calculate the rotation angular velocity and rotation angular acceleration of the joints using the rotation angles of the joints that are measured by the sensors.

Further, the second input interface may comprise a vision sensor-based input interface.

Further, the second input interface may comprise a photographing unit configured to store an image that photographs a motion of the user; a motion recognition unit configured to recognize the motion in the stored image; and a second teaching data producing unit configured to produce teaching data of the task layer based on the recognized motion.

In accordance with a second aspect of the present invention, there is provided an apparatus for producing a teaching command for a robot. The apparatus includes an input unit configured to receive teaching data of a path layer and a task layer; a teaching data interpretation module configured to interpret the teaching data of the path layer or the task layer; and a teaching data production module configured to produce a teaching command for controlling the robot using the interpreted teaching data by the teaching data interpretation module.

Further, the teaching data interpretation module may comprise a first interpreter configured to interpret the teaching data of the task layer into a sequence of the task layer using a preset learning algorithm; and a second interpreter configured to interpret the teaching data of the path layer into a robot path in a joint space or workspace of the path layer using a preset algorithm.

Further, the first interpreter may be configured to reduce the dimension of the teaching data of the task layer to perform a data encoding of the teaching data and extract semantics of the task layer from the encoded teaching data of the task layer, and the teaching command producing module may comprise a conversion unit configured to produce a semantic sequence using the semantics of the task layer; and a task sequence producing unit configured to extract a behavior semantic suitable for the semantic sequence from a behavior database having pre-stored behaviors and produce a task sequence for the robot using the extracted behavior sequence.

Further, the second interpreter may be configured to reduce the dimension of the teaching data of the path layer to encode the teaching data and decode the encoded teaching data to produce path information, and the teaching command producing module may be configured to produce joint space path information and workspace path information by applying a preset kinematic transformation algorithm to the decoded information.

In accordance with a third aspect of the present invention, there is provided a method for producing a teaching command for a robot. The method includes receiving teaching data of a path layer and a task layer; interpreting the teaching data of the task layer to produce semantics of the task layer; producing a semantic sequence using the semantics of the task layer; extracting a behavior sequence suitable for the semantic sequence from a behavior database having pre-stored behaviors and producing a task sequence of the robot using the extracted behavior sequence; and interpreting the teaching data of the path layer to produce a joint space path or workspace path of the path layer.

Further, the receiving teaching data may comprise receiving the teaching data of the task layer through an exoskeleton-type hardware-based input interface; and receiving the teaching data of the path layer through a vision sensor-based input interface.

Further, the receiving teaching data may comprise receiving rotation angles of the joints of the user through an exoskeleton-type hardware-based input interface having at least one or more sensors; calculating rotation angular velocities and rotation angular accelerations of the joints using the rotation angles of the joints; and receiving the teaching data of the path layer that is produced based on the joint rotation angle, the rotation angular velocity or rotation angular acceleration.

Further, the receiving teaching data may comprise recognizing a motion in an image that photographs the motion of the user; and receiving the teaching data of the task layer that is produced based on the recognized motion.

With the configuration of the embodiments as described above, it is possible to teach a correct path of the robot through the utilization of the teaching of the path layer by simultaneously providing the teachings of the path layer as well as the task layer. Further, it is possible to teach such that the robot can work a task in a dynamic environment through the utilization of the teaching of the task layer, thereby teaching the robot in a wide range of tasks.

In addition, the present invention proposes an apparatus for inputting robot teaching data that is capable of readily teaching without requiring the robot programming by the user of the robot teaching system in order for teaching to an exoskeleton type hardware-based input interface and a vision sensor-based input interface. Accordingly, the present invention has a merit in that it is intuitive in comparison with an offline programming or teach pendent which is a robot teaching method of the prior art and in that even a non-expert can carry out the robot teaching. As a result, it is possible to solve the inconvenience occurred due to a shortage of experts with the programming technique from among the operators at the industrial site.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

Figure 1:
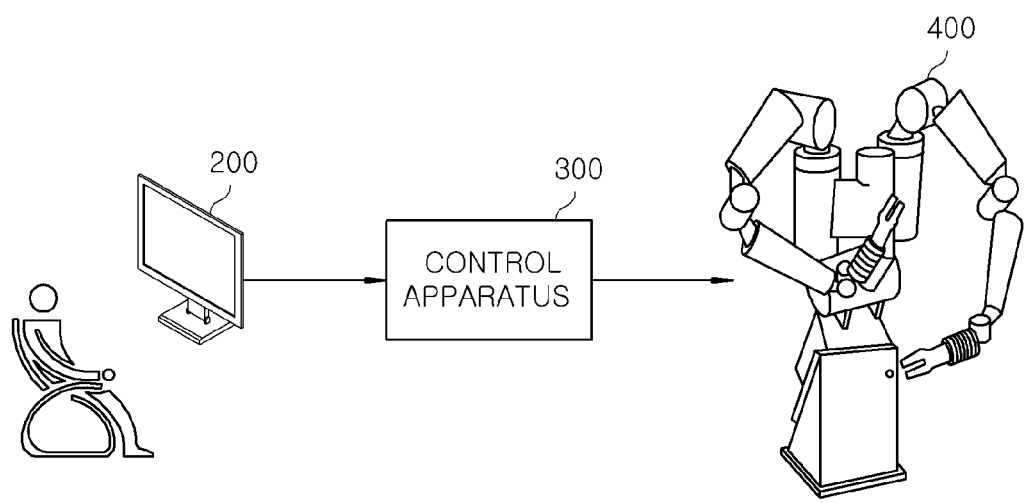
FIG. 1 shows a conceptual diagram illustrating a control system for teaching a robot in accordance with an embodiment of the present invention.

FIG. 1 shows a conceptual diagram illustrating a control system for teaching to a robot in accordance with an embodiment of the present invention.

As illustrated in the drawing, a control system for teaching to a robot includes an apparatus for inputting teaching data 200, a control apparatus 300 and a robot 400.

The teaching data inputting apparatus 200 provides an interface through teaching data of two kinds of layers, for example, a task layer and a path layer can be inputted, which will be explained in detail with reference to FIG. 2.

Figure 2:
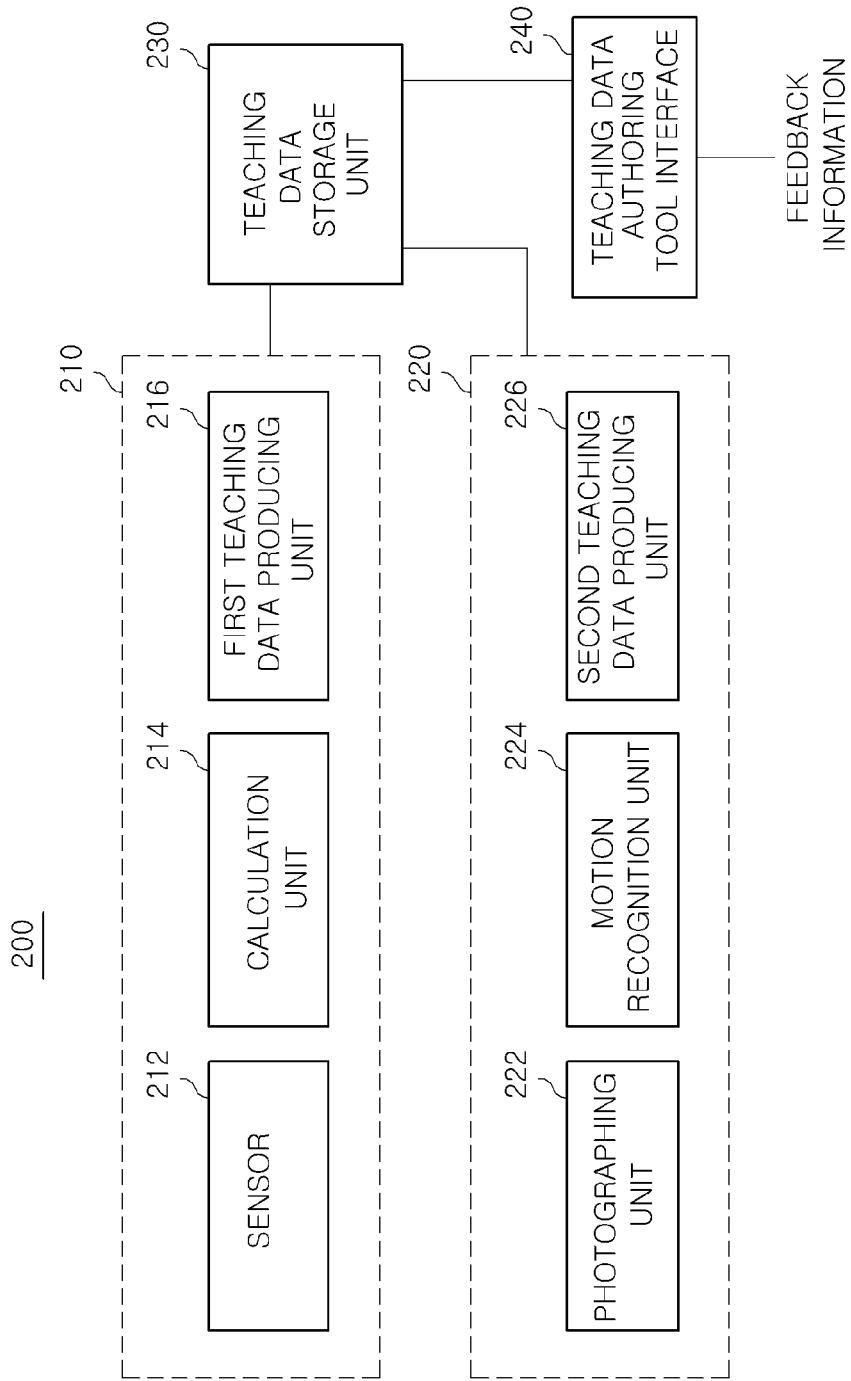
FIG. 2 is a block diagram of a configuration of an apparatus for inputting teaching data in accordance with an embodiment of the present invention.

FIG. 2 is a block diagram of a configuration of the teaching data inputting apparatus 200 in accordance with an embodiment of the present invention.

As illustrated in the drawing, the teaching data inputting apparatus 200 includes a first interface 210, a second interface 220 which may be implemented as the control system for teaching to a robot that is capable of teaching data of the task layer and path layer, a teaching data storage unit 230 and a teaching data authoring tool interface 240.

As illustrated in FIG. 2, the first interface 210 is an exoskeleton-type hardware-based interface for producing teaching data of the path layer and includes one or more sensors 212, a calculation unit 214 and a first teaching data producing unit 216.

The sensors 212 are attached to a body of the user to measure rotation angles of the joints of the user. The measured joint rotation angles of the user are provided to the calculation unit 214.

The calculation unit 214 calculates rotation angular velocity of the joints and rotation angular accelerations of the joints using the joint rotation angles with the lapse of time.

The calculation unit 214 also calculates rotating speeds and rotational accelerations of upper body joints using rotation angles of the upper body joints that are measured by the sensors 212 and periods. Specifically, the calculation unit 214 calculates rotation angular velocities of the joints and rotation angular accelerations of the joints using the joint rotation angles that are measured by the sensors 212 every preset period.

The first teaching data producing unit 216 produces the teaching data of the path layer based on the joint rotation angles, rotation angular velocities or rotation angular accelerations.

The teaching data storage unit 230 stores the produced teaching data of the path layer, and the teaching data authoring tool interface 240 corrects the teaching data stored in the teaching data storage unit 230 based on feedback information from the robot for reliability of the teaching data. The second interface 220 is a vision sensor-based input interface and includes a photographing unit 222, a motion recognition unit 224 and a second teaching data producing unit 226.

The photographing unit 222 photographs motion of the user and stores an image corresponding to the motion in a storage medium (not shown).

The motion recognition unit 224 recognizes a motion in the stored image, and the second teaching data producing unit 226 produces teaching data of the task layer based on the recognized motion.

The teaching data of the path layer and the teaching data of the task layer produced by the first interface 210 and the second interface 220, respectively, are inputted to the control apparatus 300.

The control apparatus 300 interprets the teaching data of the path layer and the teaching data of the task layer and produces commands to control the robot 400. Detailed configuration of the control apparatus 300 will be described with reference to FIG. 3.

Figure 3:
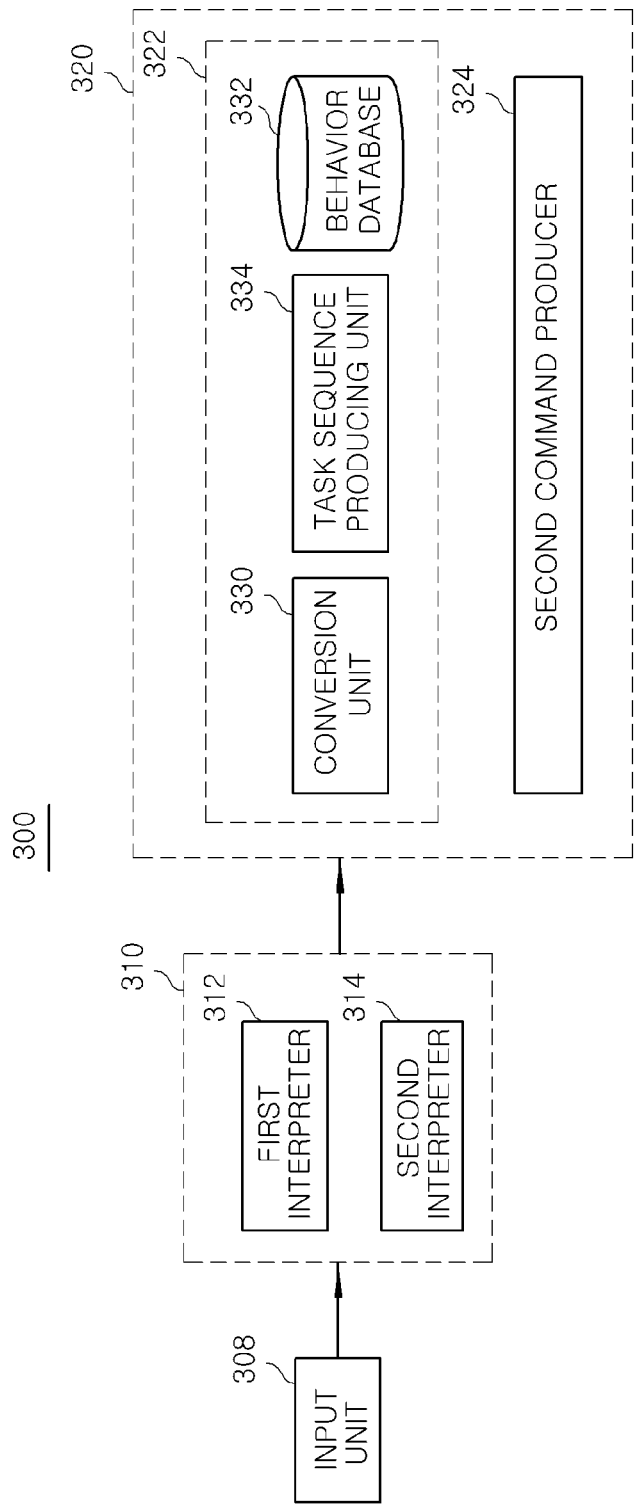
FIG. 3 is a detailed block diagram of a control apparatus in accordance with an embodiment of the present invention.

FIG. 3 is a detailed block diagram of a control apparatus in accordance with an embodiment of the present invention As illustrated in drawing, the control apparatus 300 includes an input unit 308, a teaching data interpretation module 310 and a teaching command producing module 320. The input module 308 receives the teaching data of the path layer and the task layer. Further, the teaching data interpretation module 310 includes a first and second interpreters 312 and 314 to interpret the teaching data provided from the teaching data inputting apparatus 200, and the teaching command producing module 320 includes a first and second command producers 322 and 324 to produce a first and second commands based on the interpreted teaching data.

The first interpreter 312 reduces the teaching data of the task layer before performing the data encoding of the teaching data, and performs the decoding of the encoded data to produce task information. That is, the first interpreter 312 extracts semantics of the task layer from the encoded data. The extracted semantics of the task layer are provided to the first command producer 322.

Further, the first interpreter 312 interprets the teaching data of the task layer into a sequence of the task layer using a preset learning algorithm. Here, a specific algorithm is not used as the preset learning algorithm, but some algorithms are combined to optimize a learning algorithm. Accordingly, the optimized learning algorithm is used as the preset learning algorithm. The first command producer 322 includes a conversion unit 330, a behavior database 332 and a task sequence producing unit 334.

The conversion unit 330 converts the semantics of the task layer to produce a semantic sequence.

The behavior database 332 stores data composed of one or more unit behaviors and a collection of the unit behaviors for controlling the robot 400. The data stored in the behavior database 332 are defined in the type of API (Application Program Interface) function but is not limited thereto.

The task sequence producing unit 334 retrieves the behavior database 332 to extract data suitable for the semantic sequence, for example, a behavior sequence and produces the task sequence using the extracted data.

The second interpreter 314 reduces the dimension of teaching data of the path layer before performing the data encoding of the teaching data, and performs a decoding of the encoded data to produce path information. The decoded information is then provided to the second command producer 324. Further, the second interpreter 314 interprets the teaching data of the path layer into a robot path in a joint space or workspace of the path layer using a preset algorithm. Here, the preset algorithm is designed to obtain the functions described above in advance.

The second command producer 324 produces joint space path information and workspace path information by applying a kinematics transformation algorithm to the decoded information.

Meanwhile, the control apparatus 300 controls the motion of the robot 400 based on the task sequence, the joint space path information, or the workspace path information of the joints produced by the first and second command producers 322 and 324.

While the embodiment of the present invention has been described that the teaching data inputting apparatus 200 and the control apparatus 300 are separately configured by way of example, they are combined into a one unit which controls the robot 400 in accordance with the input teaching data.

Figure 4:
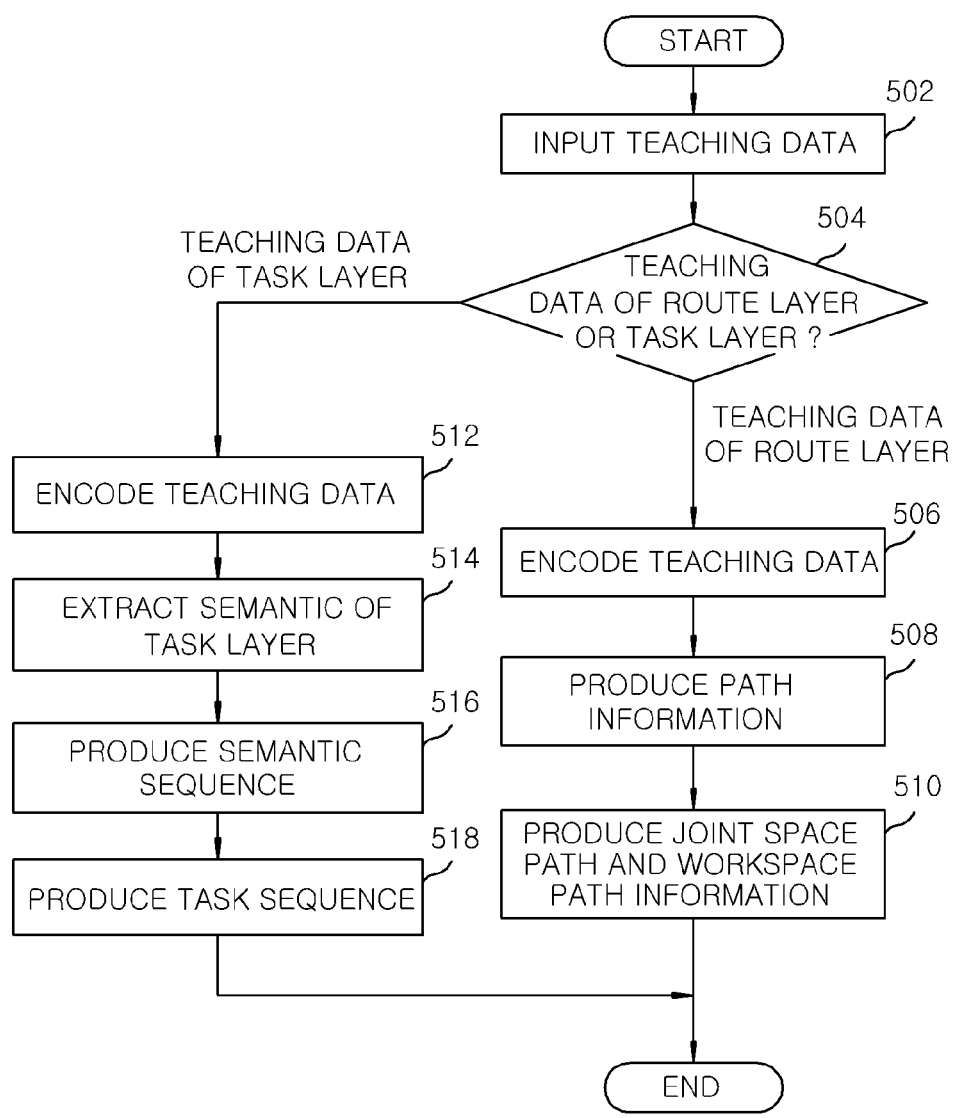
FIG. 4 is a flow chart showing a process of controlling a robot in accordance with an embodiment of the present invention.

The following is a description of a process of controlling the robot 400 through the use of the teaching data inputting apparatus 200 and the control apparatus 300 with reference to FIG. 4.

FIG. 4 is a flow chart showing a process of controlling a robot in accordance with an embodiment of the present invention.

As illustrated in drawing, when there is an input of the teaching data in block 502, the control apparatus 300 determines whether the teaching data is one of the path layer or the task layer in block 504.

As a result of the determination in block 504, when the teaching data is one of the path layer, the second interpreter 314 receives the teaching data and reduces the dimension of the teaching data of the path layer to encode the teaching data in block 506, and performs the decoding of the encoded data to produce task information in block 508. The path information is then provided to the second command producer 324.

The second command producer 324 produces joint space path information and workspace path information by applying a kinematics transformation algorithm to the decoded information, i.e., the path information.

Meanwhile, as a result of the determination in block 504, when the teaching data is one of the task layer, the first interpreter 312 receives the teaching data and reduces the dimension of the teaching data of the task layer to encode the teaching data in block 512, and performs the decoding of the encoded data to produce task information in block 508. That is, the first interpreter 312 extracts semantics of the task layer from the encoded data in block 514.

Next, the control apparatus 300 converts the semantics of the task layer to produce a semantic sequence through the conversion unit 330 in block 516, and retrieves the behavior database 332 to extract data suitable for the semantic sequence and produces the task sequence using the extracted data by use of the task sequence producing unit 334 in block 518.

Thereafter, the control apparatus 300 controls behaviors, joints and movements of the robot 400 based on the joint space path information, workspace path information and the task sequence that are produced in blocks 510 and 518.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A control apparatus of a robot, the control apparatus comprising:
    an input device that receives teaching data of a path layer and teaching data of a task layer, wherein the teaching data of the path layer is produced by a first sensing device that measures rotation angles of joints of a user, and wherein the teaching data of the task layer is produced by a second sensing device that photographs an image of a motion of the user;
    a computer processor comprising:
        a teaching data interpretation device that interprets the teaching data of the path layer and the teaching data of the task layer; and
        a teaching data production device that produces a teaching command for controlling the robot using the teaching data of the path layer and the teaching data of the task layer interpreted by the teaching data interpretation module,
    wherein the teaching data interpretation device comprises:
        a first interpreter that interprets the teaching data of the task layer into a sequence of the task layer using a preset learning algorithm; and
        a second interpreter that interprets the teaching data of the path layer into a robot path in a joint space or workspace of the path layer using a preset algorithm.

2. The control apparatus of claim 1, wherein the first interpreter is configured to reduce a dimension of the teaching data of the task layer to perform a data encoding of the teaching data of the task layer and extract semantics of the task layer from the encoded teaching data of the task layer, and
    wherein the teaching command producing module comprises:
        a conversion unit configured to produce a semantic sequence using the semantics of the task layer; and
        a task sequence producing unit configured to extract a behavior semantic suitable for the semantic sequence from a behavior database having pre-stored behaviors and produce a task sequence for the robot using the extracted behavior sequence.

3. The control apparatus of claim 1, wherein the second interpreter is configured to reduce a dimension of the teaching data of the path layer to encode the teaching data of the path layer and decode the encoded teaching data of the path layer to produce path information, and
    wherein the teaching command producing module is configured to produce joint space path information and workspace path information by applying a preset kinematic transformation algorithm to the decoded information.

* * * * *